US012370771B2

(12) United States Patent
Trani et al.

(10) Patent No.: US 12,370,771 B2
(45) Date of Patent: Jul. 29, 2025

(54) PROCESS FOR MAKING IN CONTINUOUS PRODUCTION FIBROUS WEBS WHICH ARE CORRUGATED ALONG THE MACHINE DIRECTION

(71) Applicant: Giorgio Trani, Venice (IT)

(72) Inventors: Giorgio Trani, Venice (IT); Marion Sterner, Venice (IT); Federico Cariolaro, Vicenza (IT)

(73) Assignee: Giorgio Trani, Venice (IT)

( * ) Notice: Subject to any disclaimer, the term of this patent is extended or adjusted under 35 U.S.C. 154(b) by 199 days.

(21) Appl. No.: 18/010,768

(22) PCT Filed: Jun. 28, 2021

(86) PCT No.: PCT/IB2021/055742
§ 371 (c)(1),
(2) Date: Dec. 15, 2022

(87) PCT Pub. No.: WO2022/003524
PCT Pub. Date: Jan. 6, 2022

(65) Prior Publication Data

US 2023/0264448 A1 Aug. 24, 2023

(30) Foreign Application Priority Data

Jun. 30, 2020 (IT) ........................ 102020000015811

(51) Int. Cl.
*B31F 1/22* (2006.01)

(52) U.S. Cl.
CPC ........ *B31F 1/22* (2013.01); *B31F 2201/0733* (2013.01)

(58) Field of Classification Search
CPC ........................................................ B32B 3/28
(Continued)

(56) References Cited

U.S. PATENT DOCUMENTS 3,104,197 A * 9/1963 Back .................... D21H 25/005 264/282
3,466,358 A * 9/1969 Muller ................. A24D 3/0204 425/290
(Continued)

FOREIGN PATENT DOCUMENTS

WO WO-2018154475 A1 * 8/2018 ................ B31F 1/22

OTHER PUBLICATIONS

Wikipedia search result of "paper," published on Jun. 14, 2020, available at https://en.wikipedia.org/w/index.php?title=Paper&oldid=962577311. (Year: 2020).*

*Primary Examiner* — Xiao S Zhao
*Assistant Examiner* — Inja Song
(74) *Attorney, Agent, or Firm* — Carmel Patent Agency; Robert Ballarini

(57) ABSTRACT

Process for continuously producing ribbons of corrugated fibrous material, includes:

starting from a continuous ribbon of fibrous material having transversal extensibility of not less than 8%, advancing the ribbon between a pair of forming rollers presenting ribs alternating with grooves, and having a center distance such that the ribs of one roller are partially housed within the grooves of the other roller and define between them a corrugated interspace having a thickness greater than the thickness of said ribbon and a width substantially equal to the width of the flat ribbon, which at the exit presents a longitudinal undulation obtained by transversal stretching thereof, passing the longitudinally corrugated ribbon thus obtained between a pair of stabilizing rollers with complementary ribs and grooves interpenetrating such as to present a distance between them less than the (Continued)

thickness of the ribbon thereby subjecting the ribbon to a stabilization compression of the obtained corrugations.

12 Claims, 4 Drawing Sheets

(58) Field of Classification Search
USPC ........................... 428/167; 264/286; 493/393
See application file for complete search history.

(56) References Cited

U.S. PATENT DOCUMENTS

| | | | | | |
|---|---|---|---|---|---|
| 4,285,650 | A * | 8/1981 | Muller | A24D 3/02<br>425/168 |
| 5,508,083 | A * | 4/1996 | Chapman, Jr. | B31F 1/225<br>156/244.11 |
| 2005/0006816 | A1 | 1/2005 | Drut et al. | |
| 2009/0029840 | A1* | 1/2009 | Chen | B31F 1/225<br>493/463 |
| 2017/0274616 | A1* | 9/2017 | Greenfield | D21H 27/40 |

* cited by examiner

PROCESS FOR MAKING IN CONTINUOUS PRODUCTION FIBROUS WEBS WHICH ARE CORRUGATED ALONG THE MACHINE DIRECTION

FIELD OF THE INVENTION

The present invention relates to a process for continuously producing a ribbon of corrugated fibrous material in the machine direction, in particular a ribbon presenting on its entire surface by longitudinal undulations and having high rigidity and shape stability.

BACKGROUND

Sheets of corrugated paper are known, to be used alone or also coupled with one or more sheets of smooth, i.e. non-corrugated paper, which give shape stability to the multilayer sheet.

A known technique for making sheets of corrugated paper consists in passing a sheet of smooth paper between a pair of cylinders involved over their entire lateral surface by ribs running parallel to the axis of the cylinder. The ribs are separated by grooves, in which the ribs of the other cylinder engage, forming a sort of toothed coupling between them If a sheet of paper is passed between the two cylinders, it undergoes a deformation process, which transforms it into a corrugated sheet transversely to the direction of advancement of the sheet itself, that is, the passage between these cylinders.

If it is then necessary to obtain a multilayer sheet of corrugated cardboard, sheets of non-corrugated paper are applied to one or both sides of the sheet of corrugated paper, which stabilize the shape of the corrugated sheet and form the multilayer sheet of corrugated cardboard as a whole.

This technique has proved to be valid and is currently very widespread, but it has its limitation in the fact that the cardboard obtained is corrugated only in the direction transverse to the direction of advancement of the material. Furthermore, the obtained ribbon or multilayer sheet, while having a sufficient resistance to bending in the direction orthogonal to the corrugations, has a limited resistance to bending in a direction parallel to the corrugations. It follows that, if you want to obtain the same resistance to bending in both directions, you are forced to package single sheets of cardboard and then glue them together so that they have corrugations oriented at 90° to each other and this with a non-continuous process.

Another drawback of this known technique consists in the fact that in any case it does not allow to obtain a continuous paper ribbon that is corrugated in the longitudinal direction.

To eliminate this limitation, it has already been proposed, for example in US 2005/0006816, to pass a continuous ribbon of paper between a pair of cylinders presenting a plurality of circumferential ribs and coupled together so that the ribs of a cylinder enter into the grooves of the other cylinder. If a paper ribbon is now passed between the two cylinders, this is forced to follow the profile of the two cylinders and when it comes out of these, theoretically it should have assumed a longitudinally wavy conformation.

The drawback of this known solution consists in the fact that the strip passing between the two cylinders is simultaneously presenting over its entire width by the corrugation treatment and this determines frequent longitudinal tears of the strip itself, with consequent unacceptable production rejects, which significantly affect the final costs of the product obtained.

To eliminate this drawback, it has already been proposed to create longitudinal undulations on the paper ribbon starting from the central band towards the edges. This solution, however, has the drawback of entailing a significant variation in the overall width of the output corrugated belt with respect to the inlet flat belt. It follows that in order to obtain a longitudinally corrugated belt of suitable width to meet the standard requirements in this sector, it is necessary to feed the forming machine with a paper belt of a width much greater than that of the standards, with the need to provide, upstream of the forming rollers, a support structure for the roll of paper to be treated having a size significantly greater than the size of the forming machine itself. Furthermore, with the same width of the inlet flat belt, the width of the longitudinally corrugated belt thus obtained is influenced by the shape and size of the corrugations.

SUMMARY

The object of the invention is to provide a process for the continuous production of longitudinally corrugated fibrous tapes which have shape stability and high rigidity.

Another object of the invention is to propose a method for making continuous longitudinally corrugated ribbons of fibrous material without in any way reducing the width of the incoming flat ribbon with respect to the width of the longitudinally exiting corrugated ribbon.

Another object of the invention is to propose a process for the production of longitudinally corrugated ribbons of fibrous material without breaks and rejects during production.

Another object of the invention is to propose a process for the production of longitudinally corrugated ribbons of fibrous material which allows to reach high production speeds.

Another object of the invention is to propose a process for the production of continuous longitudinally corrugated paper ribbons with different and improved characteristics.

Another object of the invention is to propose a process for making continuous longitudinally corrugated paper belts, with which it is possible to prepare multilayer corrugated cardboard of different types, including crossed ones.

Another object of the invention is to propose a continuous process with which to produce multilayers of fibrous material having increased flexural strength thanks to the coupling of transversely corrugated tapes with longitudinally corrugated tapes.

All these objects and others that will emerge from the following description, are achieved, jointly or separately, according to the invention with a process for continuously producing ribbons of fibrous material, in particular of paper, longitudinally corrugated and having high rigidity and shape stability, as set forth below.

BRIEF DESCRIPTION OF THE DRAWINGS

The present invention is further clarified hereinafter in some of its preferred embodiments reported for purely illustrative and non-limiting purposes with reference to the attached drawing tables, in which.

DETAILED DESCRIPTION OF THE PREFERRED EMBODIMENTS

The method according to the invention intends to transform, by means of three-dimensional deformation, a paper ribbon that can be stretched transversely from 8% to 60%, preferably from 8%-35%, in the transversal direction into a longitudinally corrugated ribbon having shape stability and high rigidity.

Figure 1:
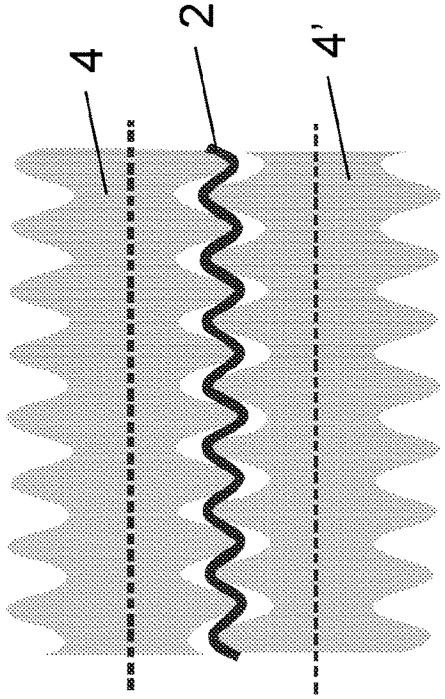
FIG. 1 schematically shows in transverse section a pair of forming rollers of the longitudinally corrugated paper ribbon, FIG. 2 schematically shows in the same view of FIG. 1 a pair of stabilizing rollers of the longitudinally corrugated paper ribbon, FIG. 3 schematically shows the pair of rollers of FIG. 1 in a variant embodiment.

FIG. 1 schematically shows a portion of extensible paper which can freely slide and deform according to the degree of interpenetration of said rollers.

Figure 3:
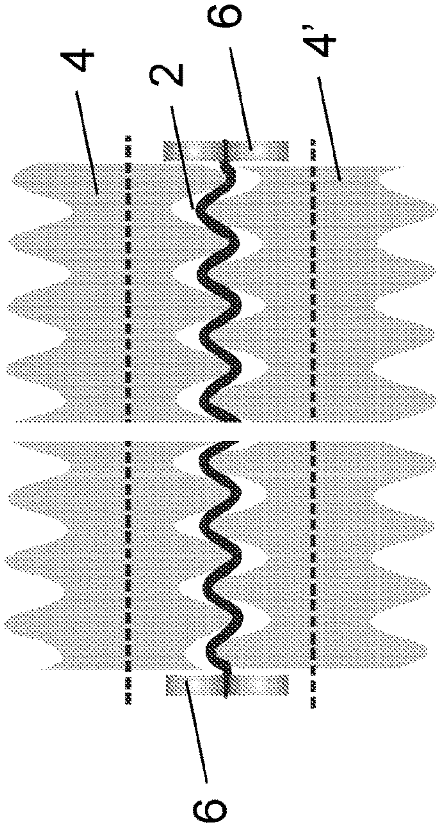

In practice, in the passage of the extensible paper belt 2 between the two forming rollers 4,4', coupled so that their circumferential ribs/grooves are partially penetrating, the ribbon itself is dragged by the ribs of the two rollers 4,4' a follow a wavy path, exploiting its transversal extensibility at this stage. This is allowed, in the case of a ribbon 2 of high width paper, by the friction due to the weight of the ribbon itself which rests on the lower roller 4' and in the case of a ribbon 2 of limited width or in any case if the simple friction between the belt 2 and the lower roller 4' is not sufficient, retaining the belt itself along the longitudinal edges, for example by means of pairs of retaining rollers 6 placed alongside the forming rollers 4,4' (see FIG. 3).

After the paper ribbon 2 has passed between the pair of forming rollers 4,4' it is made to pass between a pair of stabilizing rollers 8,8', which are positioned so that the ribs of one invade almost totally, and in any case with a distance between them less than the thickness of the paper to be treated, the depressions existing between the ribs of the other and cause a crushing of the corrugated belt between the two, with consequent stabilization of the corrugations created when the two forming rollers pass 4,4'.

Figure 2:
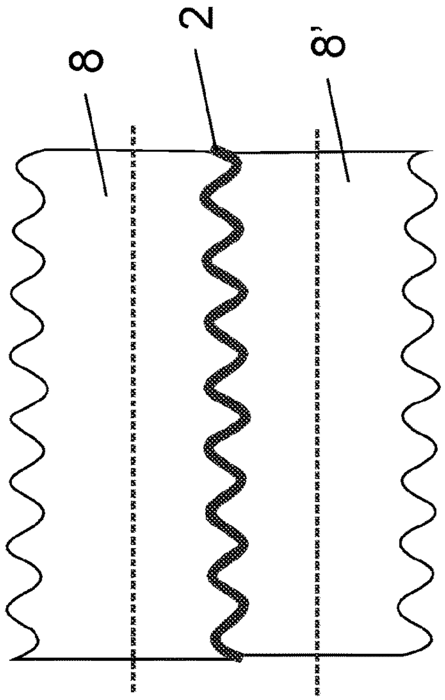

FIG. 2 schematically shows how this stabilization by pressing takes place.

Both the forming rollers 4,4' and the stabilizing rollers 8,8' are preferably made of metal, or in any case of hard materials that are not deformable in themselves, but could be coated with a ceramic layer, Teflon or even with more or less slippery areas.

Figure 4:
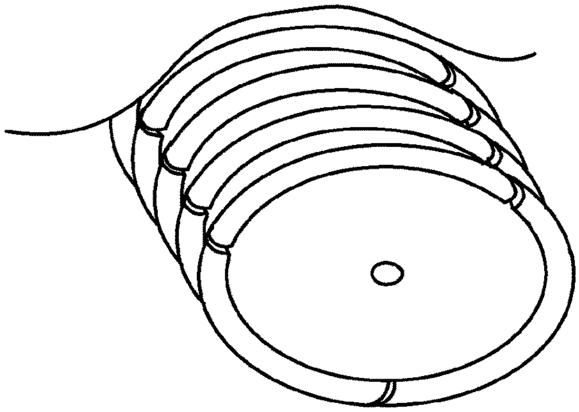
FIG. 4 shows in perspective view a different embodiment of one of the two rollers of FIG. 1, FIG. 5 schematically shows in a first embodiment a plant for obtaining a longitudinally corrugated paper ribbon, FIG. 6 schematically shows it in a second embodiment.

Regardless of whether the circumferentially ribbed rollers are forming rollers or stabilizing rollers, their ribs can be continuous or they can also be interrupted, as illustrated in FIG. 4, in order to allow, especially for the stabilizing rollers 8,8', the venting of the air inevitably present between the paper and the roller and thus to avoid tearing of the paper ribbon.

Figure 5:
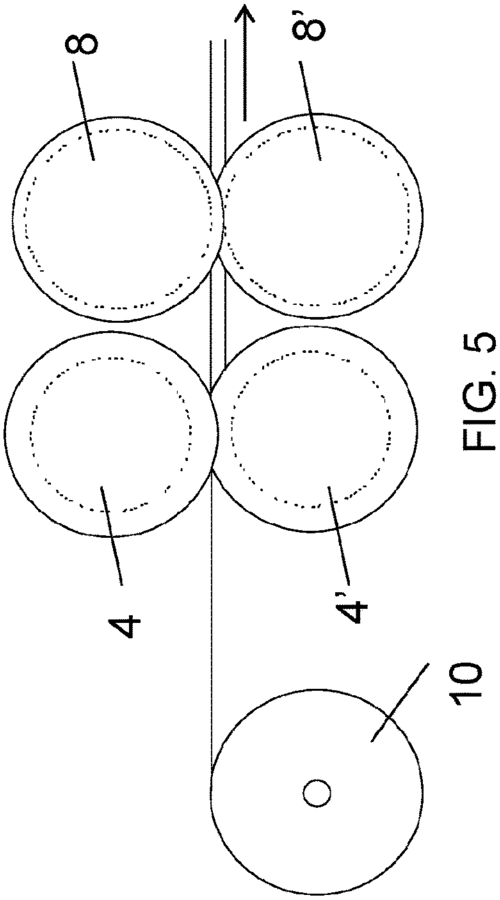

FIG. 5 schematically shows the process steps in side view: the transversely extensible paper ribbon 2 is unwound from a reel 10 and is fed to the pair of forming rollers 4,4' and from there to the pair of stabilizing rollers 8,8'.

Figure 6:
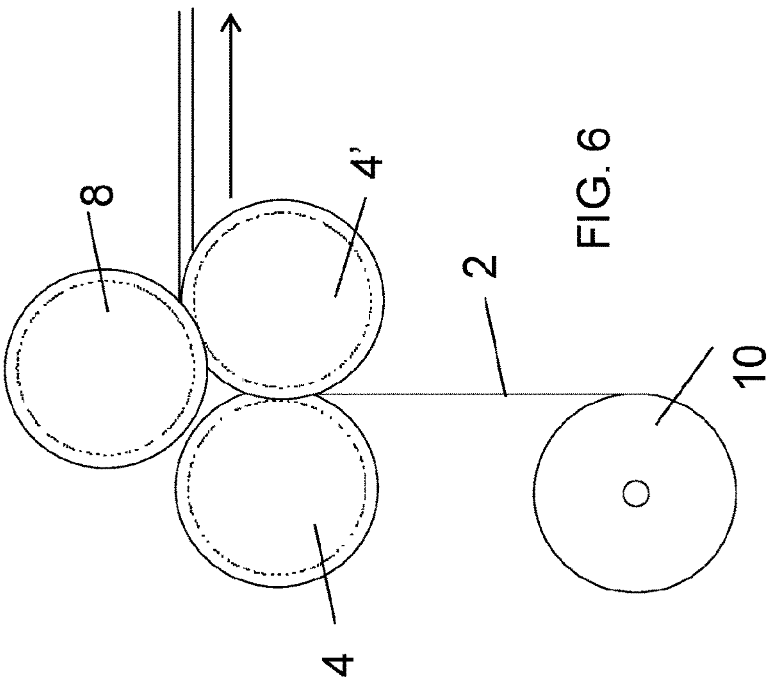

FIG. 6 shows a plant in which the same roller 4' can be coupled first with a forming roller 4 to undulate the paper ribbon 2 and subsequently with a stabilizing roller 8 to stabilize the shape of the newly corrugated ribbon.

Figure 7:
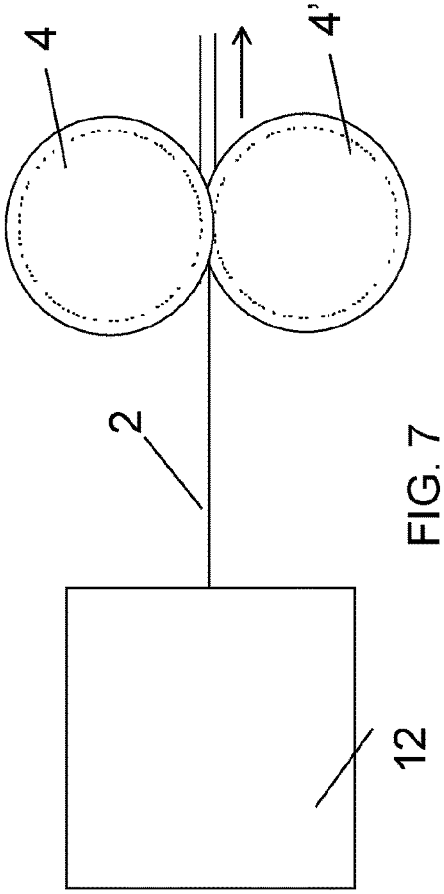
FIG. 7 shows a part of the plant of FIG. 5 or FIG. 6 coupled to a plant for producing an extensible paper ribbon, FIG. 8 schematically shows a part of the plant in FIG. 5 or 6 coupled to an implant 13 as described in the patent WO2018154475, FIG. 9 schematically shows the succession of implants of FIG. 5 or 6 with FIG. 8, FIGS. 10-13 show different examples of corrugated paper ribbons obtained according to the invention and variously coupled to each other.
Figure 8:
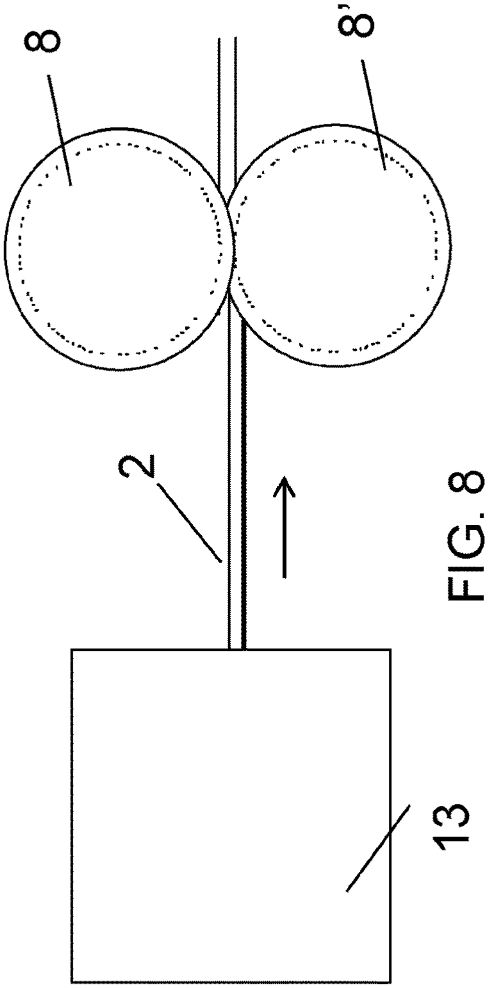
Figure 9:
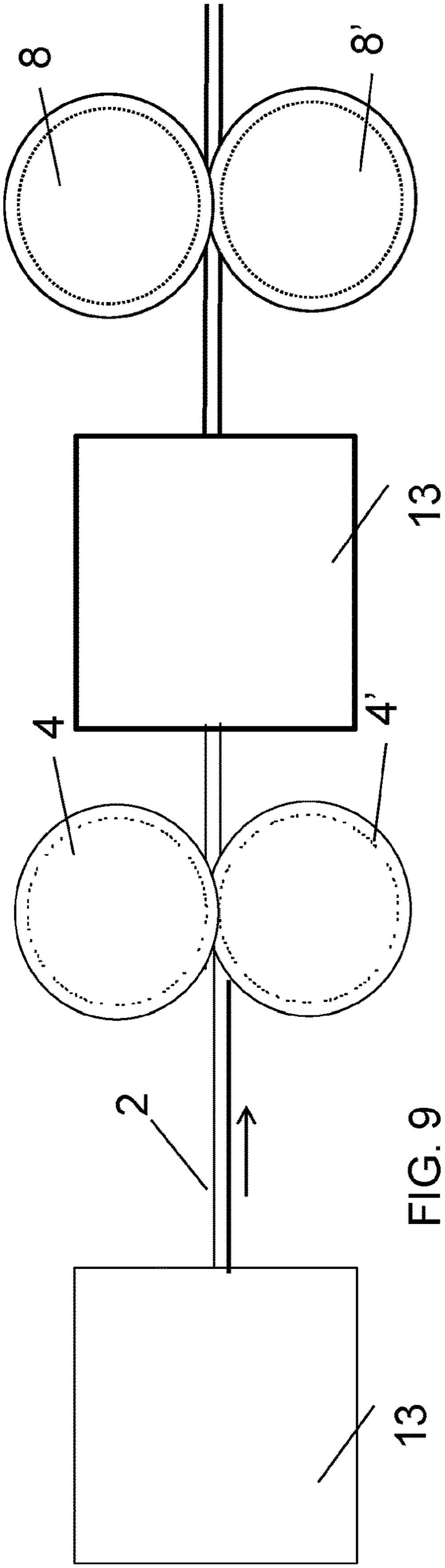
Figure 13:
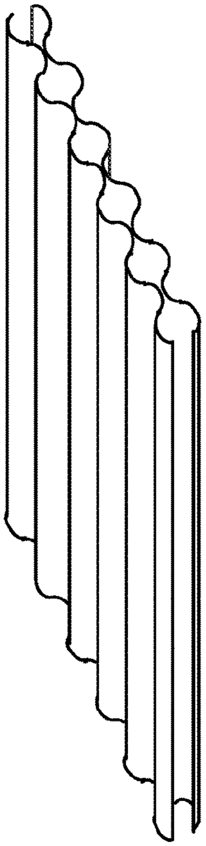
Figure 14:
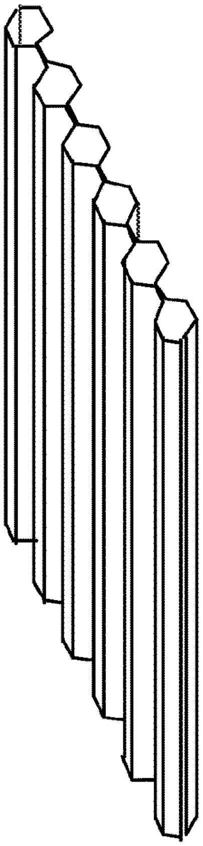
FIG. 14 shows an example of a double layer of corrugated paper ribbons in which the stabilizing rollers have also formed the final shape wave.
Figure 15:
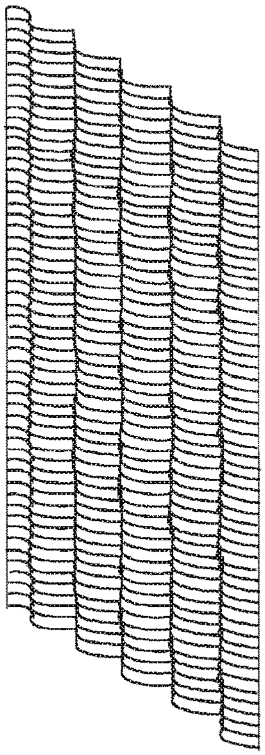
FIG. 15 shows an example of a corrugated paper tape according to FIG. 8 or 9.
Figure 10:
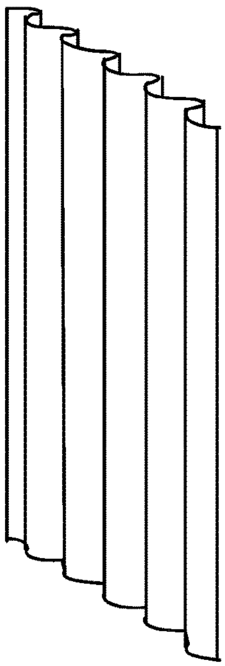
Figure 11:
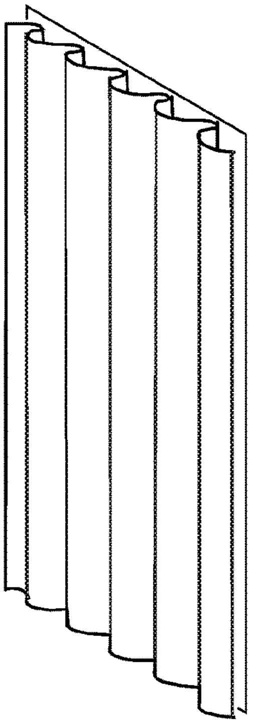
Figure 12:
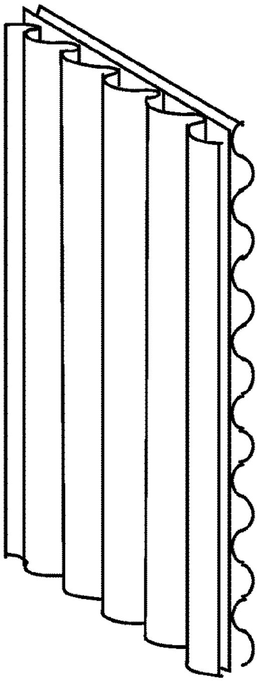

Regardless of the type of plant, this can be fed with a transversely extensible paper ribbon unwound from a reel 10 or coming from a downstream transversely extensible paper production plant 12 (see FIG. 7).

The forming rollers 4,4' can have a surface which, apart from the circumferential ribs, is smooth or one of them can be advantageously rougher, i.e. corrugated, structured, knurled, if it is desired to advance the two rollers at a different peripheral speed, in order to obtain a first stabilization of the longitudinal waves obtained.

Regardless of the nature of the lateral surface of the forming rollers 4,4' and stabilizing rollers 8,8', they can be obtained with any known technique, i.e. by creating circumferential grooves on a perfectly cylindrical starting roll or by applying ribs to a cylindrical roller made separately.

Furthermore, the profile of the forming rolls 4,4' need not be identical to the profile of the stabilizing rolls 8,8', in the sense that, for example, the profile of the former could be sinusoidal, while the profile of the latter could be, for example, square wave, trapezoidal, etc., as long as they have the same period.

Finally, it is also provided that the belt to be treated is also subjected to a longitudinal traction obtained by the tension of the belt between the beginning and the end of the corrugation, in order to make the corrugation process more effective and stable.

Example 1

A fibrous ribbon 2 of at least 8% elongation in the transverse direction is fed between a pair of forming rolls 4,4'. The interpenetration between the ribs of the two rollers is not total and this creates free areas between them, between which the paper ribbon 2 can slide and stretch, not being held or blocked by the ribs themselves. The result is a three-dimensionally deformed ribbon in a continuous process, presenting stable longitudinal corrugations of shape, without having restricted the width of the sheet at the inlet with respect to the width at the outlet.

Example 2

A fibrous ribbon having at least 8% elongation in the transverse direction and at least 10% in the longitudinal direction is fed between a first pair of forming rolls 4,4', which carries out a first elongation step by deformation on the ribbon. In this case the ribs of the upper roller 4 mate with the valleys of the lower roller 4' so that the fibrous ribbon can stretch around the rib. The thus corrugated strip enters between a second pair of forming rollers (not shown) which are more interpenetrating, which carry out a second forming step by deformation in the area in which no definitive deformation had previously occurred. The result is a three-dimensionally deformed ribbon in a continuous process, presenting stable longitudinal corrugations of shape, without having restricted the width of the sheet at the inlet with respect to the width at the outlet.

Example 3

After carrying out the deformation according to one of the examples described above, the sheet by now deformed with longitudinal waves is introduced between a pair of stabilizing rollers 8,8' which exert a pressure on the corrugated paper ribbon to stabilize the longitudinal corrugations and to stiffening the belt itself Example 4

The patent WO2018154475 teaches to obtain longitudinal undulations without tightening the band of the material, by means of a cylinder with circumferential ribs which cooperates with an elastically compressible pressure element and which generates a speed reduction effect with respect to this cylinder. The longitudinal corrugation thus obtained from this process, which in turn has an elongation of the fibrous ribbon of at least 10%, can now be inserted in the process described above, i.e. in the pair of forming rollers 4, 4', followed by the pair of rollers stabilizers 8, 8', or simply just the pair of stabilizing rollers.

Example 5

A longitudinally corrugated material obtained according to example 2 is inserted into the line immediately afterwards in the process described by patent WO201 8154475 and already mentioned in example 4. A longitudinally corrugated material always comes out, to which further elongability is again imparted both in the transverse direction and also in the longitudinal direction, maintaining and tracing the corrugation given by the pairs of rollers 4, 4' and/or 8, 8'. If you wish to further investigate the waves obtained, one or more repetitions of the process described are used. If, on the other hand, one wishes to exploit the elongation thus obtained, a paper tape with high elongation in both directions is obtained for further processing, such as three-dimensional deformations with known techniques.

Materials:

With fibrous tape we mean paper tapes, composed of vegetable fibers, but also tapes composed of synthetic fibers, and tapes of a mix of vegetable and synthetic fibers, nonwoven fabric as long as they have an elongation of at least 8% in the transverse direction, preferably more than 15%, or at least 8% transversally and also longitudinally. It is understood that they can contain all the additives of the known art that such materials normally have. Such ribbons to be corrugated longitudinally can be dry treated, but can have a degree of dryness between 65% and 95%, and preferably between 70% and 85%, or they can be moistened in place before corrugation.

With the rollers counter-toothed means of metal rollers but also of hard polymeric materials, optionally coated with special layers such as chrome coatings, ceramics, etc., May also have different surface slipperiness and structures, even of different speeds In the case if fibrous ribbons with a transversal elongation greater than 8% are not available, it is envisaged that at least one device to generate the necessary elongation is placed upstream of the three-dimensional deformation station with longitudinal waves. Many high transverse elongation fibrous ribbons also exhibit high longitudinal elongation, e.g. 10% to 60%, and preferably 10% to 35%, which in turn has a positive effect also on the transverse stretching in the three-dimensional deformation station through the tension of the ribbon itself. Based on the depth and the design of the wave, the required paper elongation will be calculated accordingly.

The ribbon obtained with longitudinal waves can subsequently be sent for further processing such as the covering by gluing on at least one side with an additional smooth sheet. In case a smooth sheet is applied on each side, the natural arrangement of the fibers in the longitudinal direction takes advantage of the waves arranged in the same direction in terms of stability and rigidity of a future box. If these smooth sheets are in turn made of paper that can be extended by at least 5% in each direction, further processing such as creasing to create the folding lines of future boxes will be facilitated. Such a multilayer can also be subjected to three-dimensional deformation to obtain, for example, trays with increased rigidity, also exhibiting thermal insulation properties.

The ribbon obtained with longitudinal waves can also, with or without intermediate smooth sheet, be glued to at least one layer of traditional corrugated in a continuous process. In this way the mechanical properties of such a composite become more isotropic, that is, this panel resists the bending and bulging of future boxes in all directions.

The invention claimed is:

1. Process for continuously producing ribbons of corrugated fibrous material the process comprising:

placing at least a pair of first forming rollers (4,4') having circumferential ribs alternating with circumferential grooves on lateral surfaces thereof so that the ribs of one roller of the pair of first forming rollers interpenetrate, at least partially, the grooves of the other roller of the pair of first forming rollers, thus defining a wavy gap between the two rollers;

advancing a continuous ribbon (2) of fibrous material between said pair of first forming rollers (4,4'), said continuous ribbon (2) having a thickness less than a thickness of the wavy gap and a transverse extensibility of at least 8%, thereby causing the continuous ribbon to take on a corrugated shape corresponding to the wavy gap's shape, at the same time submitting the continuous ribbon (2) to transversal stretching in order to maintain the continuous ribbon's initial width despite the ribbon's greater transverse extension due to corrugation;

passing the corrugated ribbon coming out of said pair of first forming rollers (4,4') between a pair of second stabilizing rollers (8,8') having circumferential interpenetrating ribs alternating with circumferential grooves on lateral surfaces thereof so that a wavy gap is defined between the circumferential interpenetrating ribs of one roller of the pair of the second stabilizing rollers and the grooves of the other roller of the pair of the second stabilizing rollers, and the wavy gap of the pair of second stabilizing rollers has a thickness less than the continuous ribbon's thickness so that the corrugated ribbon that passes between the second stabilizing rollers is subjected to a compression in a direction of the corrugated ribbon's thickness and to a subsequent stabilization of the corrugations thus obtained.

2. The process according to claim 1 wherein one of the two first forming rollers (4,4') also constitutes one of the two second stabilizing rollers (8,8').

3. The process according to claim 1 wherein the continuous ribbon has the transverse extensibility of at least 15%.

4. The process according to claim 1 wherein the continuous ribbon has the transverse extensibility of at least 20%.

5. The process according to claim 1 wherein the continuous ribbon has the transverse extensibility of at least 25%.

6. The process according to claim 1 wherein the continuous ribbon also has a longitudinal extensibility of at least 10% in addition to the transverse extensibility.

7. The process according to claim 1 wherein the continuous ribbon also has a longitudinal extensibility of at least 15% in addition to the transverse extensibility.

8. The process according to claim 1 wherein the continuous ribbon also has, in addition to the transverse extensibility, a longitudinal extensibility of at least 25%.

9. The process according to claim 1, wherein the continuous ribbon is produced directly upstream of the forming rollers.

10. The process according to claim 1, wherein said corrugated ribbon is coupled with at least one non-corrugated ribbon.

11. The process according to claim 1 wherein said continuous ribbon (2) is held at longitudinal edges thereof as the continuous ribbon passes between said first forming rollers (4,4').

12. The process according to claim 1 wherein at least one of said first forming rollers (4,4') or said second stabilizing rollers (8,8') comprise circumferential ribs that are interrupted.

* * * * *